(12) United States Patent
Zicher (10) Patent No.: US 6,479,767 B1
(45) Date of Patent: Nov. 12, 2002

(54) WEIGHING APPARATUS AND METHOD

(76) Inventor: Heinz P. Zicher, 1535 N. Douglas Ave., Arlington Heights, IL (US) 60004

( * ) Notice: Subject to any disclaimer, the term of this patent is extended or adjusted under 35 U.S.C. 154(b) by 0 days.

(21) Appl. No.: 09/511,480

(22) Filed: Feb. 23, 2000

(51) Int. Cl.[7] .......................... G01G 19/00; G01G 23/01
(52) U.S. Cl. .......................... 177/145; 141/83; 73/1.13; 177/50
(58) Field of Search ...................... 177/145, 50; 141/83; 209/592, 596, 645, 648; 73/1.13

(56) References Cited

U.S. PATENT DOCUMENTS

| | | | | |
|---|---|---|---|---|
| 3,802,522 | A | * 4/1974 | Thompson | 177/121 |
| 4,139,069 | A | * 2/1979 | Domis et al. | 177/50 |
| 4,146,467 | A | * 3/1979 | Sauer et al. | 209/645 |
| 4,393,950 | A | * 7/1983 | Klopfenstein et al. | 177/108 |
| 4,407,379 | A | * 10/1983 | Pryor et al. | 177/52 |
| 5,101,982 | A | * 4/1992 | Gentili | 209/592 |
| 5,220,969 | A | * 6/1993 | DeBarber et al. | 177/145 |
| 5,256,835 | A | * 10/1993 | Rydzak | 177/145 |
| 5,626,236 | A | * 5/1997 | Hiebert | 209/538 |
| 5,640,334 | A | * 6/1997 | Freeman et al. | 73/1.13 |
| 5,740,843 | A | * 4/1998 | Burkart | 141/83 |
| 5,877,457 | A | * 3/1999 | Corniani et al. | 141/83 |
| 5,929,387 | A | * 7/1999 | Inglin | 177/145 |
| 6,073,667 | A | * 6/2000 | Graffin | 141/83 |
| 6,080,938 | A | * 6/2000 | Lutz | 73/1.13 |
| 6,084,184 | A | * 7/2000 | Troisi | 177/145 |
| 6,162,998 | A | * 12/2000 | Wurst et al. | 177/145 |

* cited by examiner

*Primary Examiner*—Randy W. Gibson
(74) *Attorney, Agent, or Firm*—Meroni & Meroni, P.C.; Charles F. Meroni, Jr; Paul D. Pressley (57) ABSTRACT

A weighing transducer is secured onto a fixed base. The fixed base is positioned in order to allow the weighing transducer to rest securely over a conveyor belt. An electrically actuated gripper is connected to the weighing transducer allowing the weighing transducer to accurately weigh any item freely suspended from the electrically actuated gripper. The conveyor belt works synchronously with the holding device in order to obtain an accurate weight reading by taking a no load weight reading prior to the weighing of each item to be measured. The conveyor belt delivers an item to be weighed to the electrically actuated gripper which in turn captures the item. When the item is delivered to the electrically actuated gripper, the conveyor belt stops. The item is captured by the electrically actuated gripper and the conveyor belt is lowered to a height sufficient to enable the item to be suspended freely on the electrically actuated gripper. With the item suspended on the electrically actuated gripper, the weighing transducer is now able to acquire an accurate measurement of the weight of the item. Once the item is weighed the conveyor belt rises and the weighed item is then released by the electrically actuated gripper and conveyed away from the electrically actuated gripper while another item is conveyed to the electrically actuated gripper.

11 Claims, 6 Drawing Sheets

WEIGHING APPARATUS AND METHOD

BACKGROUND OF THE INVENTION

1. Field of the Invention

The present invention relates to a weighing apparatus and method for the rapid and accurate weighing of items moving along a packaging or assembly line.

2. Description of the Prior Art

The weighing of items produced during the manufacturing process to assure that the weight of the produced item meets with the weight specifications for the product is a vital and necessary task in many industries. This is especially true in the food, pharmaceutical, and cosmetics industries where the weights of the products are typically inspected by the FDA, USDA or other governmental agency. Many manufacturing lines in these industries produce items at a rate of 30 or more items per minute making the speed of the weighing process critical.

Due to the need for accurate weighing of the product by the manufacturer, and the need to maintain a relatively rapid production line, many manufacturers rely on statistical sampling methods in order to estimate the average weight of the product. These statistical sampling methods typically include manually placing the product on a platform balance which has been calibrated to NIST standards and taking a weight reading once the platform balance is sufficiently stable. By sampling a sufficiently large population of the produced items, an average weight and a standard deviation is determined. However, statistical sampling does not inspect a 100% of the items produced and the process is relatively slow. Also, in most cases where statistical sampling is employed, the weighings are performed outside the manufacturing area and as a result, the items sampled must typically be destroyed in order to prevent the possibility of contamination.

Statistical weight sampling is also currently performed using automated means. These methods typically require robotic or mechanical diversion of the items to be sampled from the manufacturing line to a weighing station away from the line where they are weighed. The traditional process for weighing items using automated means typically include (1) convey the item from the manufacturing line to a weigh station, (2) tare the weighing apparatus, (3) position the item on the weigh station, (4) wait for a stable weight reading, (5) record the weight reading, (6) remove the item from the weigh station, and (7) convey the item back to the manufacturing line. Due to the length of time it takes to perform a weight reading, these automated methods typically are not fast enough to perform an inspection of a 100% of the items produced.

High speed check weighing processes are also currently being used in order to weigh items on a production line. These high speed check weighing processes generate a weight reading while the items are in motion. However, since these weight readings are acquired while the items are in motion, the resulting weight measurements are not traceable to NIST standards. Furthermore, these high speed check weighing procedures are typically limited in the minimum and maximum weights that can be weighed, and they are also limited in the weight resolution that can be achieved.

Accordingly, there is a need for a weighing apparatus and method rapid enough to operate at production rate line speeds in order to allow the weighing of 100% of the items produced for release.

Accordingly there is also a need for a weighing apparatus and method which can be done in line while the items remain on the manufacturing line eliminating the need to divert the items to a weighing station away from the manufacturing line.

Accordingly, there is also a need for a weighing apparatus and method that is accurate and capable of being NIST certified.

The present invention is a weighing apparatus and method for the rapid and accurate weighing of items moving along on a packaging or assembly line.

As will be described in greater detail hereinafter, the present invention solves the aforementioned and employs a number of novel features that render it highly advantageous over the prior art.

SUMMARY OF THE INVENTION

Accordingly, it is an object of this invention to provide a weighing apparatus and method rapid enough to operate at production rate line speeds in order to allow the weighing of 100% of the items produced for release.

Accordingly, it is also an object of this invention to provide a weighing apparatus and method which can be performed in line while the items remain on the manufacturing line eliminating the need to divert the items to a weighing station away from the manufacturing line.

Accordingly, it is a further object of this invention to provide a weighing apparatus and method that is accurate and capable of being NIST certified.

To achieve these objectives, and in accordance with the purposes of the present invention the following weighing apparatus and method for the repeated rapid and accurate weighing of items moving along on a packaging or assembly line is presented.

The apparatus and method for weighing relies on a weighing assembly that is physically fixed in place with no moving parts upon which a weighing transducer is attached. The weighing transducer is secured onto a fixed base. The fixed base is positioned in order to allow the weighing transducer to rest securely over the conveyance means. Since the fixed base does not move, the weighing transducer is able to take weight readings with minimal motion related instability. The weighing transducer is preferably a load cell or a plurality of load cells.

A holding device is operatively coupled to the weighing transducer allowing the weighing transducer to accurately weigh any item freely suspended from the holding device. The conveyance means works synchronously with the holding device in order to obtain an accurate weight reading. The conveyance means delivers the item to be weighed to the holding device that in turn captures the item. Once the item is conveyed to the holding device, the conveyance means then stops. The item is captured by the holding device, immediately followed by the lowering of the conveyance means to a height sufficient to enable the item to be suspended freely on the holding device, typically a distance of less than 0.1 inch. With the item suspended on the holding device, the weighing transducer is able to take an accurate measurement of the weight of the item. Once the item is weighed the conveyance means rises, the weighed item is then released by the holding device and conveyed away from the holding device while another item is conveyed to the holding device.

The method for weighing items starts with first taking a no load weight reading while conveying an item to the holding device. Once the item is at the holding device, the conveyance means is then stopped. The item is captured by the holding device and the conveyance means is lowered allowing the item captured on the conveyance base to be suspended with only the weighing transducer supporting the holding device and the captured item. The weight reading is then performed with the item as the load. After the weight reading is performed the conveyance base is raised to its initial height so that the item is no longer suspended on the holding device. The item is released by the holding device 10 and the item is conveyed away while another item is conveyed to the holding device.

This process eliminates the need to tare the weighing apparatus, a necessary step in the prior art. The weight readings taken by the weighing transducer is digitally sent to a monitoring processor means which first takes the no load reading and subtracts that to the subsequent load readings which then results in the weight of the item. The weight of the item is then available to transcribe to a report or to utilize in order to determine whether the item passes weight requirements.

The entire weighing process takes less than a second to complete. Repeatable weight readings having a resolution of 0.01 grams are taken within 0.1 seconds. Also, by employing multiple apparatuses in tandem, even higher throughput can be achieved. Consequently, the weighing process can be put directly in line with the normal manufacturing process without slowing down the manufacturing process, and enabling a 100% of the items produced to be weight sampled.

Other objects, features, and advantages of the invention will become more readily apparent upon reference to the following description when taken in conjunction with the accompanying drawings.

DESCRIPTION OF THE PREFERRED EMBODIMENT

The present invention is a weighing apparatus and method for the repeated rapid and accurate weighing of items moving along on a packaging or assembly line.

Figure 1:
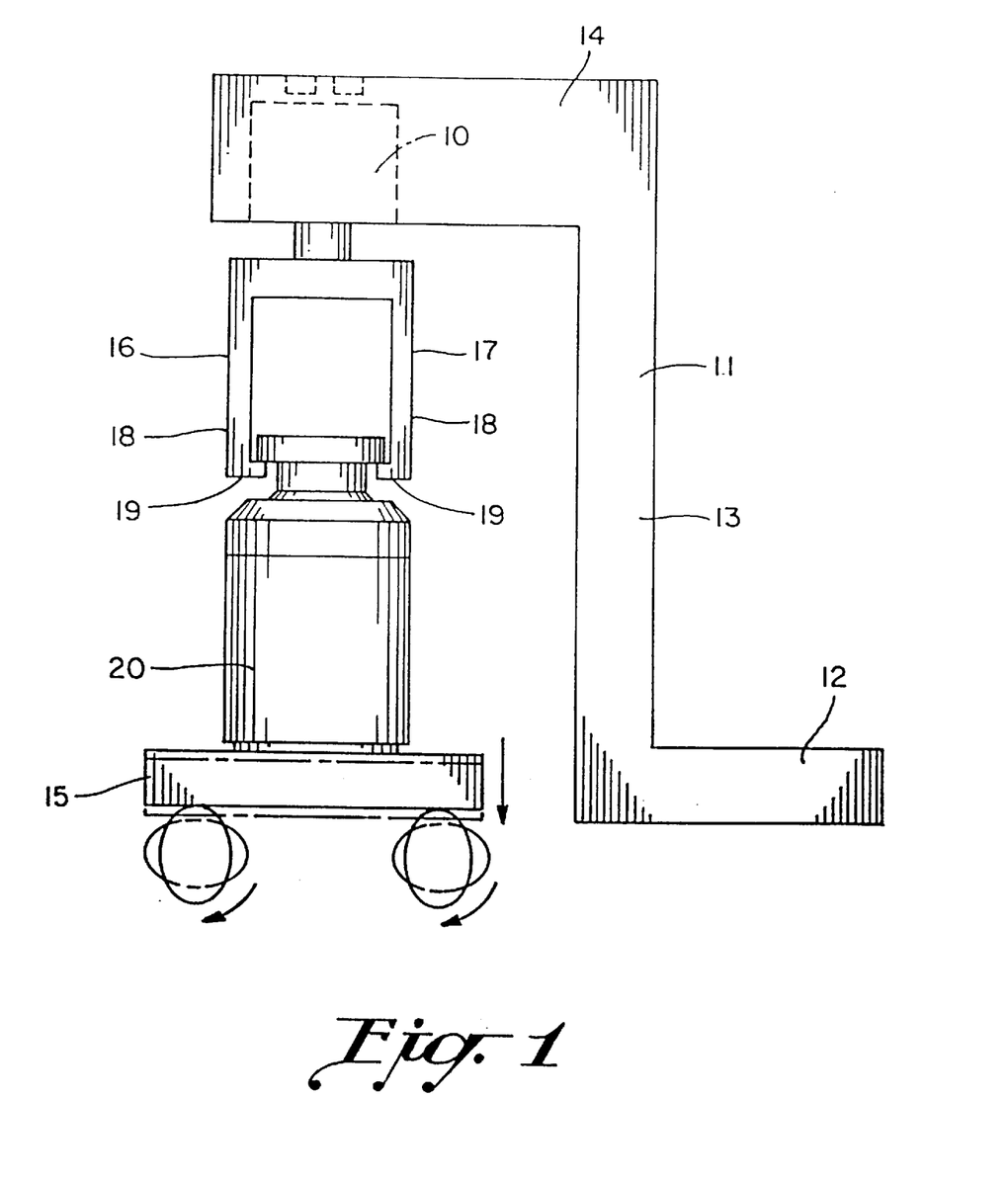
FIG. 1. A side view of my weighing apparatus showing features.
Figure 2:
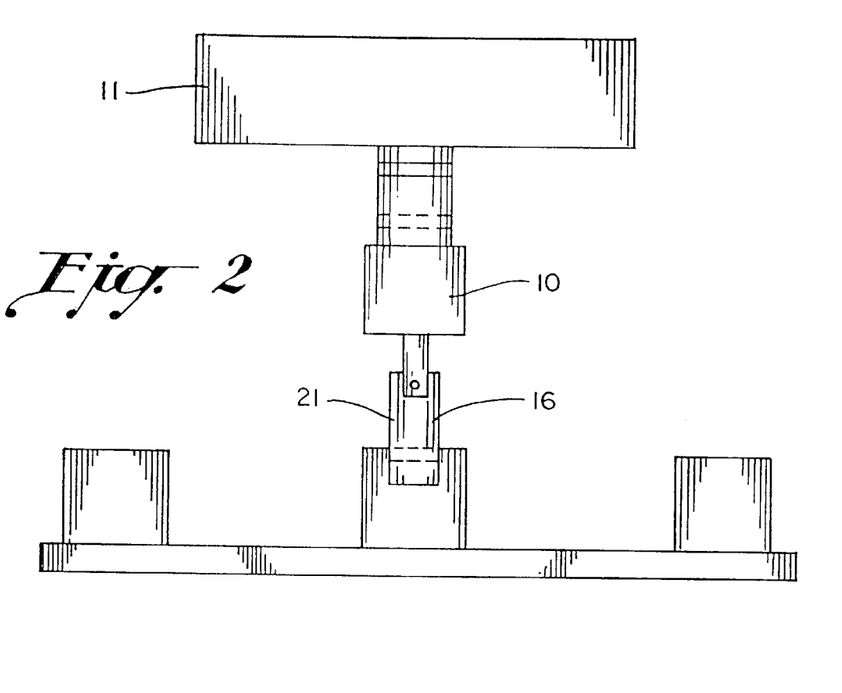
FIG. 2. A front view of my weighing apparatus showing an item being captured by a holding device.
Figure 3:
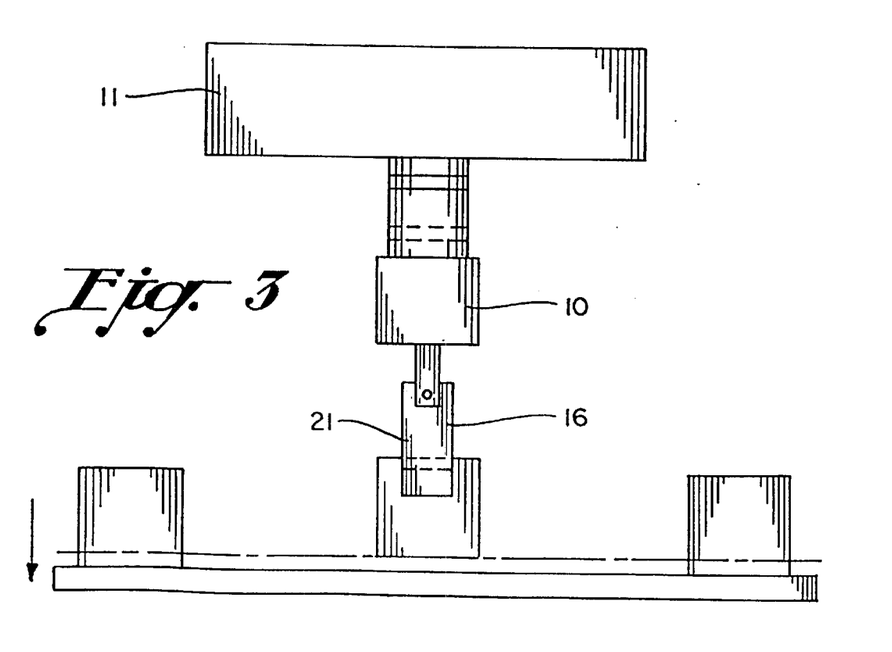
FIG. 3. A front view of my weighing apparatus shown in FIG. 2 during a weighing.

Referring to FIGS. 1, 2 and 3, the apparatus and method for weighing relies on a weighing assembly that is physically fixed in place with no moving parts upon which a weighing transducer 10 is attached. In the preferred configuration of my invention, the weighing transducer 10 is secured onto a fixed base 11. The fixed base 11 may be securely mounted on a ceiling over a conveyance means 15 or it may be a floor mounted unit having a first section 12 mounted onto a floor, a second section 13 extending from the first section in an upward direction, and a third section 14 extending over the conveyance means 15. The fixed base 11 is positioned in order to allow the weighing transducer 10 to rest securely over the conveyance means 15. Since the fixed base 11 does not move, the weighing transducer 10 is able to take weight readings with minimal motion related instability.

The weighing transducer 10 is preferably a load cell or a plurality of load cells. There are a variety of different load cells offered in the market most of which are or can be NIST certified. Load cells come in a variety of weighing ranges and offer exceptional linearity and minimal physical deformation at full scale readings.

Referring to FIG. 1, a holding device 16 is operatively coupled to the weighing transducer 10 allowing the weighing transducer 10 to accurately weigh any item freely suspended from the holding device 16. In the preferred embodiment, the holding device 16 is a U-shaped structure 17 having two arms 18 extending in a downward direction from the weighing transducer 10. Each arm 18 has a ledge 19 extending therefrom, the ledges 19 extending relatively parallel to each other and towards or opposing the opposing arm 18. The U-shaped structure 17 is used to suspend items having a geometry which enables the items to be suspend on the ledges 19, such as bottles 20.

Referring to FIGS. 2 and 3, in an alternative embodiment to the holding device 16, the holding device is an electrically actuated gripping fixture 21 which clamps onto items as they pass between the holding pads 22 and releases the item once a weighing has occurred. The electrically actuated gripping fixture 21 is appropriate when the item to be weighed does not have the appropriate geometry to be suspended from the U-shaped structure 17.

Referring to FIGS. 1, 2, and 3, the conveyance means 15 works synchronously with the holding device 16 or the holding pads 22 in order to obtain an accurate weight reading. The conveyance means 15 delivers the items to be weighed to the holding device 16 or the holding pads 22. The conveyance means 15 then stops and the holding device 16 or the holding pads 22 then capture the item. Once the item is captured by the holding device 16 or the holding pads 22, the conveyance means 15 then lowers to a height sufficient to enable the item to be suspended freely on the holding device 16 or holding pads 22, typically a distance of less than 0.1 inch. With the item suspended on the holding device 16 or holding pads 22, the weighing transducer 10 is able to take an accurate measurement of the weight of the item. After the item is weighed, the conveyance means 15 rises back to its original height, the weighed item is then released by the holding device 16 or by the holding pads 22 and conveyed away from the holding device 16 or holding pads 22 while another item is conveyed to the holding device 16 or the holding pads 22. In the preferred embodiment, the conveyance means rests on an oval shaped cam means 24 which rotates causing the conveyor means 15 to rise and fall systematically.

Figures 7, 8:
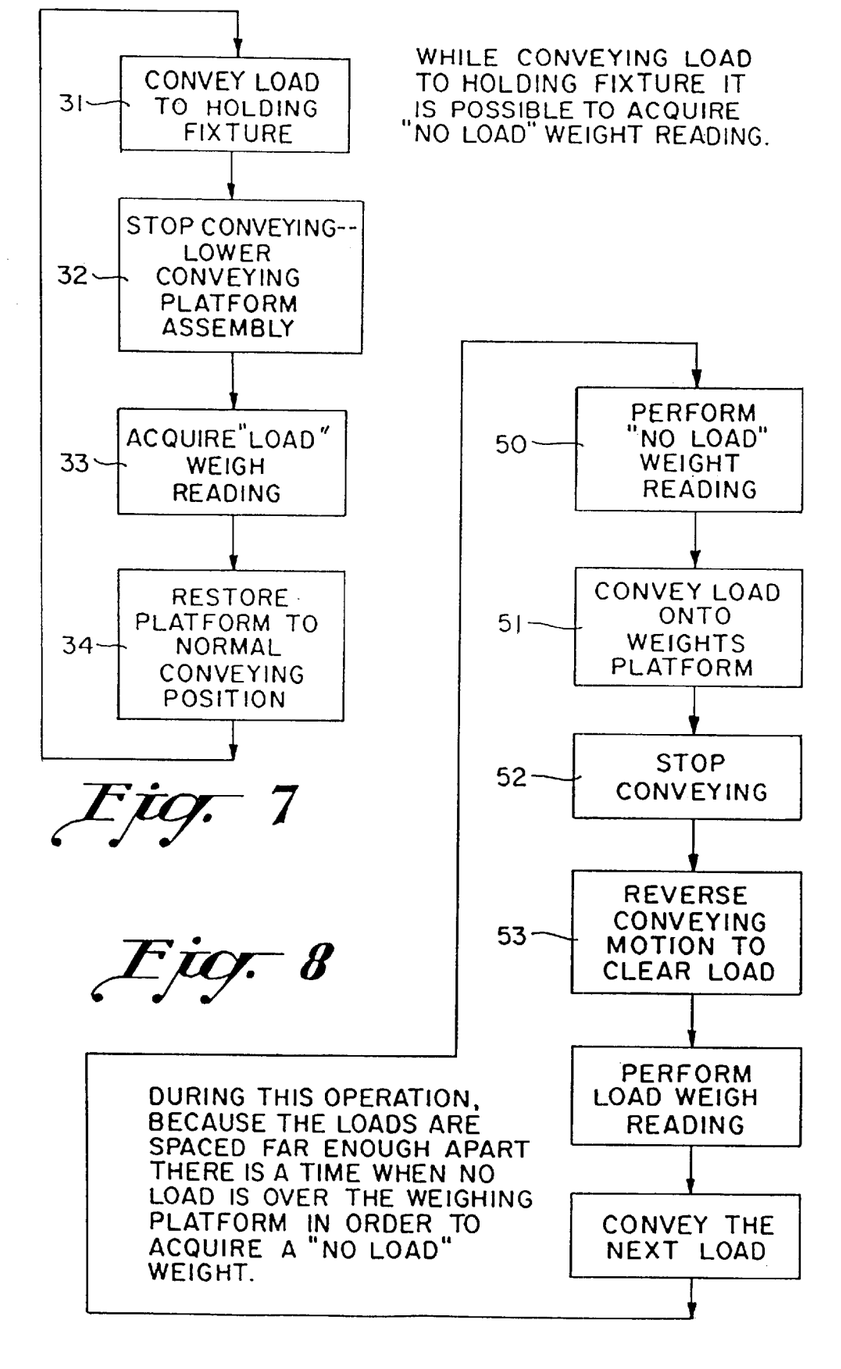
FIG. 7. A flow diagram of a method of measuring utilizing my weighing apparatus.
FIG. 8. A flow diagram of a method of measuring utilizing the alternative configuration of my weighing apparatus.

Referring to FIG. 7, the method for weighing items utilizing the preferred configuration starts with first taking a no load reading while conveying an item to the holding device 31. Once the item is at the holding device, the item is captured by the holding device. The conveyance means is then stopped and lowered allowing the item captured on the conveyance base to be suspended with only the weighing transducer supporting the holding device and the captured item 32. The weight reading is then performed with the item as the load 33. After the weight reading is performed the conveyance base is raised to its initial height so that the item is no longer suspended on the holding means 34. The item is released by the holding device and the item is conveyed away while another item is conveyed to the holding device.

This process eliminates the need to tare the weighing apparatus before each production run, a necessary step in the prior art. The prior art weighing apparatuses require taring before each production run so that weight readings acquired during the production run will be accurate. Therefor, all weight readings taken during the production run are reflective of the initial taring of the apparatus before each production run. Because all weight readings are based upon a single taring, the weights do not reflect variations in the readings of the weighing apparatus due to temperature and other factors.

In the claimed invention, the weight readings taken by the weighing transducer are digitally sent to a monitoring processor means which first takes a no load reading before each weighing and subtracts the no load reading from the subsequent load readings which then results in the weight of the item. The weight of the item is then available to transcribe on a report or to utilize in order to determine whether the item passes weight requirements. This effectively allows the weighing apparatus in the claimed invention to be tared before each weighing, thus providing a more accurate weight reading. Therefore, taring of the weighing apparatus before each production run is not needed due to the no load reading being taken between each weighing of an item.

Furthermore, given that the natural physical ringing frequency of a load cell is typically less than 1 millisecond, stable weight readings can be acquired almost instantly using a load cell as the weight transducer. Combined with the need to lower the conveyance base only a distance of less than 0.1 inch in order to suspend the item on the holding device, the entire weighing process takes less than a second to complete. The preferred configuration is able to take stable weight readings at a rate of higher than one per second. Repeatable weight readings having a resolution of 0.01 grams are taken within 0.1 seconds. Also, by employing multiple apparatuses in tandem, even higher throughput can be achieved. Consequently, the weighing process can be put directly in line with the manufacturing process without slowing down the manufacturing line.

Figure 4:
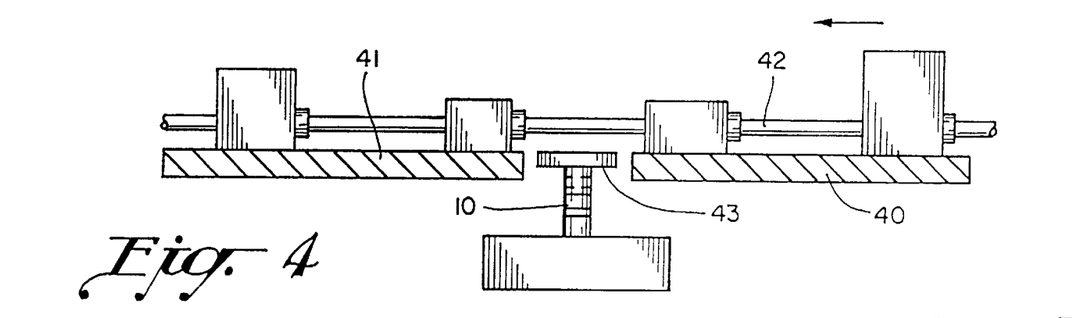
FIG. 4. A front view of an alternative configuration of my weighing apparatus.
Figure 5:
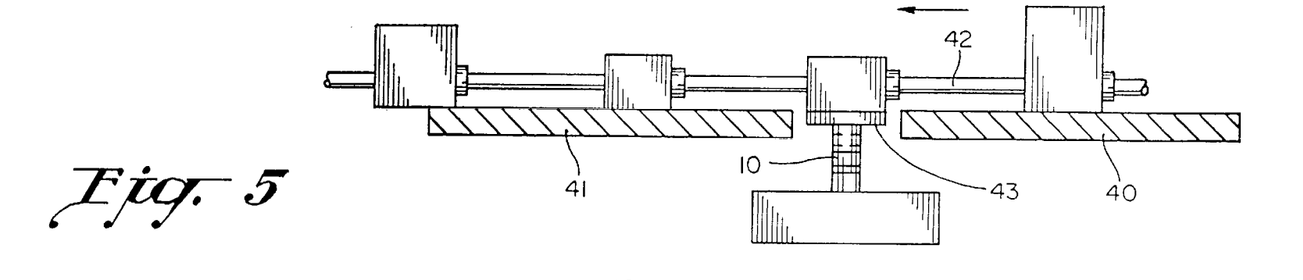
FIG. 5. A front view of the alternative configuration in FIG. 4 just prior to a weighing.
Figure 6:
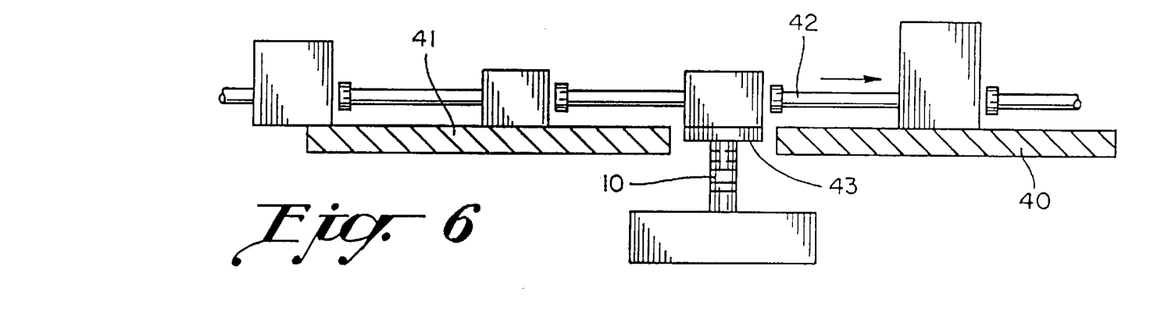
FIG. 6. A front view of the alternative configuration in FIG. 4 during a weighing.

Referring to FIGS. 4, 5, and 6, in an alternative configuration of my invention, the conveyance means is comprised of a first conveyance base section 40, a second conveyance base section 41, and a positioning means 42. The fixed base 11 is positioned in between the first conveyance base section 40 and the second conveyance base section 41. The weighing transducer 10 is secured onto the fixed base and a weighing platform 43 is operatively coupled on top of the weighing transducer 10. The weighing platform 43 is positioned in between, but not in contact with, the first conveyance base section 40 and the second conveyance base section 41.

Referring to FIGS. 4, 5, 6, and 8, prior to having an item placed on the weighing platform 43, a no load weighing is taken 50. The positioning means 42 then guides items along the first conveyance base section 40 to the weighing platform 43, 51. Once the item is resting on the weighing platform, the positioning means 42 then stops 52 and reverses direction a sufficient distance to break contact with the item 53, allowing the item to be accurately weighed (load weigh reading) 54. Once the item is weighed, the positioning means 42 then reverses direction again and positions the item off the weighing platform 43 and onto the second conveyance base section 41 and guides another item to be weighed onto the weighing platform 43.

Figures 9, 10:
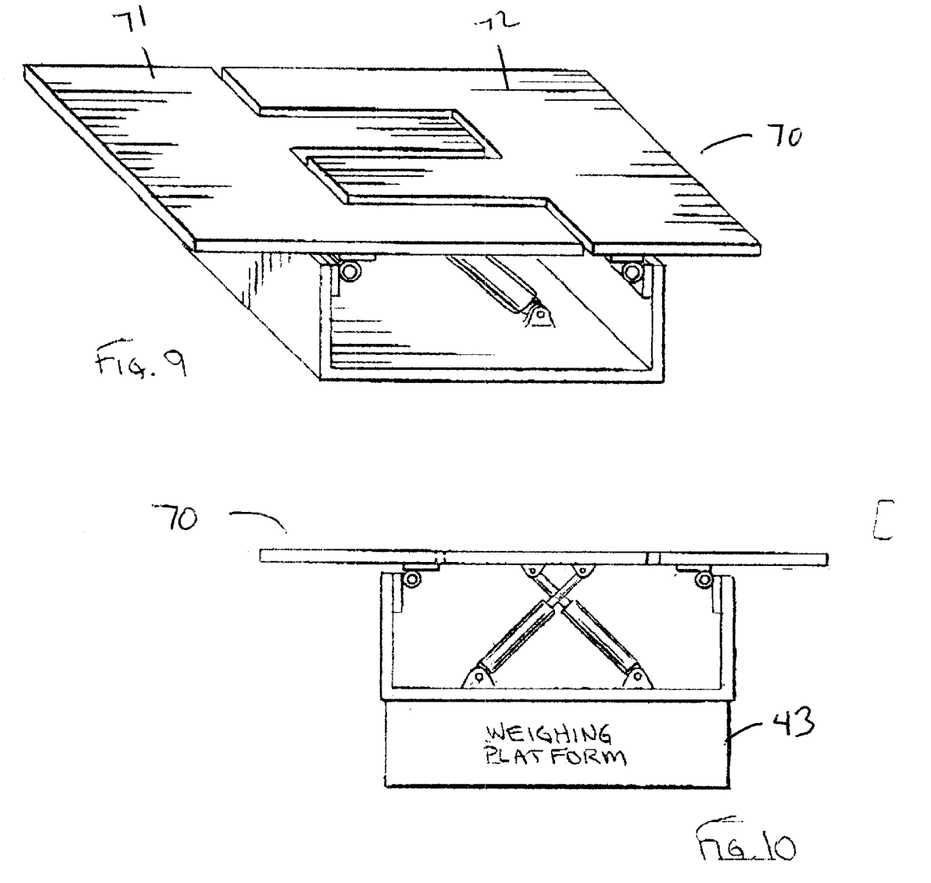
FIG. 9. A side perspective view of a rejection means which can be used with the alternative configuration of my weighing apparatus.
FIG. 10. A side view of the rejection means attached to a weighing platform.
Figure 11:
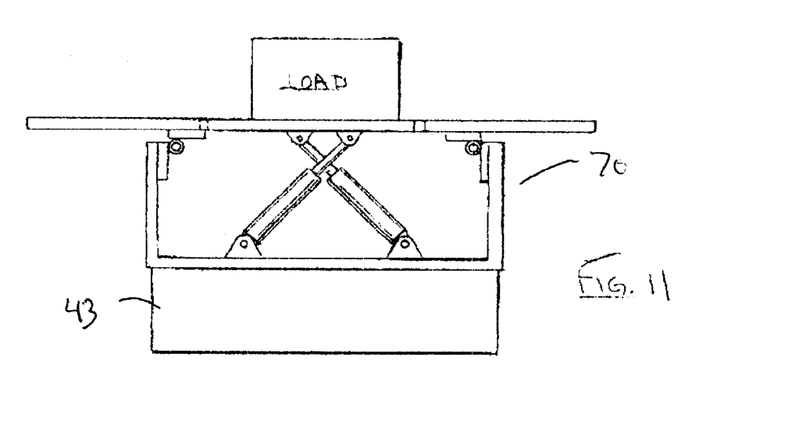
FIG. 11. A side view of the rejection means in FIG. 10 with a load thereon.

Referring to FIGS. 9, 10, and 11, a major advantage of the alternative configuration is that a rejection means 70 may be placed on the weighing platform 43 without affecting the ability of my invention to take an accurate weight reading. A load supporting surface of the rejection means 70 is positioned so that it is at the same height as the first and second conveyance base sections 40, 41. The rejection means 70 is linked to the monitoring processing means. In addition to determining the weight of an item, the monitoring processing means also determines if the weight of an item is within an acceptable range. If the weight of the item is not within the acceptable range, the monitoring processing means activates the rejection means which then diverts item from the manufacturing line.

Figure 12:
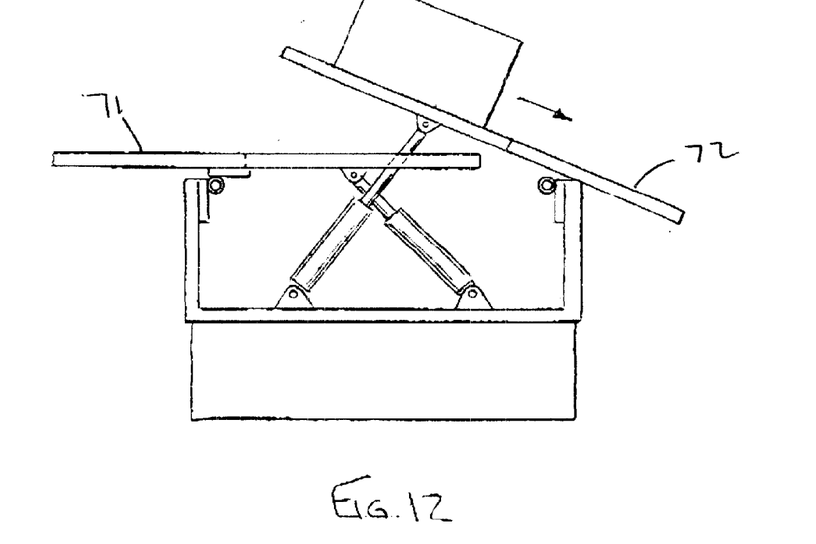
FIG. 12. A side view of the rejection means in FIG. 11 with one guide activated thereby diverting the load.
Figure 13:
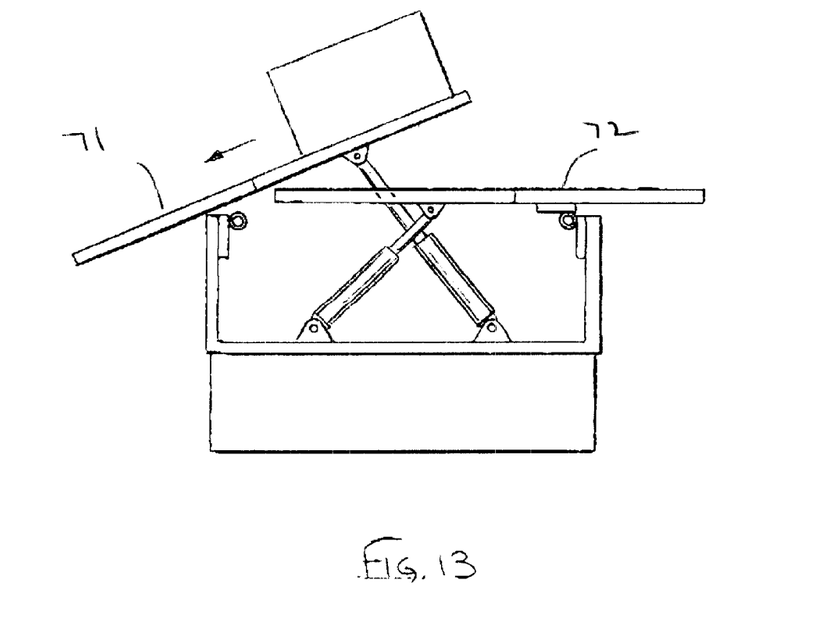
FIG. 13. A side view of the rejection means in FIG. 11 with an opposite guide activated thereby diverting the load in an opposite direction.

Referring to FIGS. 9, 12 and 13, preferably, the rejection means is capable of diverting an item in more than one direction. In the preferred embodiment of the rejection means, the rejection means has two independently actuated rejection guides 71, 72. The direction in which a rejected item is diverted is dependent upon which rejection guide is activated. Preferably, the monitoring processing means determines which rejection guide is activated. As such, the items can be diverted in different directions based on being over and under weight.

The invention described above is the preferred embodiment of the present invention. It is not intended that the novel device be limited thereby. The preferred embodiment may be susceptible to modifications and variations that are within the scope and fair meaning of the accompanying claims and drawings.

I claim:

1. An inline weighing apparatus for the rapid and accurate weighing of multiple items passing along on a conveyance base, the weighing apparatus comprising:

a fixed base;

a weighing transducer, the weighing transducer secured to the fixed base;

a processing means connected in circuit to the weighing transducer, the processing means allowing the weighing transducer to take a no load weight reading before the weighing of an item;

a holding device, the holding device operatively coupled to the weighing transducer allowing the weighing transducer to accurately weigh any item freely suspended from the holding device, the holding device capturing, and releasing items which pass underneath; and a conveyance means, the conveyance means delivering items to be weighed to the holding device at an interval allowing the weighing transducer to take the no load weight reading before the weighing of each item, the conveyance means stopping to allow the holding device to capture the item, and lowering after the holding device captures the item to be weighed enabling the item to be suspended freely on the holding device, and enabling the weighing transducer to acquire a weight measurement of the item, the conveyance means rising to its original height once the weight measurement is taken and proceeding to convey the weighed item away from and bringing another item to the holding device.

2. The weighing apparatus in claim 1 wherein the holding device is a U-shaped structure having two arms extending in a downward direction from the weighing transducer, each arm having a ledge extending therefrom, the ledges extending relatively parallel to each other and towards or opposing the opposing arm, the U-shaped structure used to suspend items having a geometry which enables the items to be suspended on the ledges.

3. The weighing apparatus in claim 1 wherein the holding device is an electrically actuated gripping fixture which clamps onto items as they pass beneath the holding device and releases the items once a weighing has occurred.

4. The weighing apparatus in claim 1 wherein in the weighing transducer is a load cell.

5. The weighing apparatus in claim 1 wherein the conveyance means lowers and rises a distance of approximately 0.1 inches.

6. The weighing apparatus in claim 5 wherein the fixed base has a first section mounted onto a floor or from a ceiling, a second section extending from the first section in an upward direction, and a third section extending over the conveyance means.

7. A weighing method for the rapid and accurate weighing of multiple items passing along on a conveyance base, the weighing method comprising:

taking a no load weight reading of a holding device coupled to a weighing transducer prior to the weighing of each item that is weighed;

conveyance of an item to the holding device through the use of a conveyance base;

positioning the item on the holding means;

stopping the conveyance base;

lowering the conveyance base, suspending the item on the holding means;

performing load weight reading;

subtracting the no load weight reading taken just prior to the load weight reading from the load weight reading;

acknowledging the value obtained from subtracting the no load weight reading from the load weight reading;

raising the conveyance base so that the item is no longer suspended on the holding means;

releasing the item from the holding means; and continuing the conveyance base thereby removing the item from the holding means.

8. An inline weighing apparatus for the rapid and accurate weighing of multiple items passing along on a conveyance base, the weighing apparatus comprising:

a fixed base;

a weighing transducer secured to the fixed base;

a U-shaped electrically actuated gripping fixture having two arms extending in a downward direction from the weighing transducer, each arm having a ledge extending therefrom, the ledges extending relatively parallel to each other and towards or opposing the opposing arm, the gripping operatively coupled to the weighing transducer allowing the weighing transducer to accurately weigh any item freely suspended from the gripping fixture, the gripping fixture capturing, and releasing items which pass underneath; and a conveyance means, the conveyance means delivering items to be weighed to the gripping fixture, the conveyance means stopping to allow the gripping fixture to capture the item, and lowering after the gripping fixture captures the item to be weighed enabling the item to be suspended freely on the gripping fixture, and enabling the weighing transducer to acquire a weight measurement of the item, the conveyance means rising to its original height once the weight measurement is taken and proceeding to convey the weighed item away from and bringing another item to the gripping fixture.

9. The weighing apparatus in claim 8 wherein the processing means allows the weighing transducer to take a no load weight reading and a load weight reading at least five times per second with a resolution of at least 0.01 grams.

10. The weighing apparatus in claim 8 wherein in the weighing transducer is a load cell.

11. The weighing apparatus in claim 9 wherein the conveyance means lowers and rises a distance of approximately 0.1 inches.

* * * * *